Patent content

3,729,413
PROCESS FOR THE REMOVAL OF CYANIDE FROM SEWAGE BY MEANS OF FORMALDEHYDE

Zoltán Csürös, József Petró, Zsigmond Dusza, Zsuzsa Simó nee Bárczy, István Turcsán, and József Vaczulin, Budapest, Hungary, assignors to NIKEX Nehezipari Kulkereskedelmi Vallalat, Budapest, Hungary
No Drawing. Filed Apr. 28, 1971, Ser. No. 138,350
Int. Cl. C22c 5/02
U.S. Cl. 210—59     6 Claims

ABSTRACT OF THE DISCLOSURE

Sewage is decyanized with formaldehyde and the formed product recovered. The essence of the method is that a formaldehyde solution of at least pH 8 alkalinity is added under intensive agitation to the sewage, the solution allowed to stand at temperatures ranging from room temperature to 100° C. for 50–1 hours and heated or boiled. To improve the economy of the method in given cases the ammonia is absorbed and the formed glycolic acid recovered from the solution. The method can be applied to the detoxication of both dilute and concentrated cyanide-containing sewage.

---

This invention relates to the removal of cyanide (decyanation) of sewage and to the recovery of the formed products.

Several methods are now in use for the removal of cyanide from industrial sewage. In the literature the most often the following methods are mentioned:

(1) Air is led through the acidified sewage whereby the formed HCN is expelled from the solution (e.g. Czechoslovakian Pat. No. 96,653).

(2) Anodic oxidation in a 3% b.w. sodium chloride solution (e.g. Polish Pat. No. 49,679).

(3) Oxidation by means of chlorine gas or alkali hypochlorite (e.g. U.S. Pat. No. 2,725,314).

(4) Addition of a ferrous salt solution to form ferrous cyanide, treated subsequently with a ferric salt solution whereby insoluble $Fe_4(Fe/CN_6)_3$ (Prussian blue) is formed in the water (see Ullmann's Enzyclopädie der technischen Chemie, vol. 5, 1954, p. 641).

For the removal of cyanide from industrial sewage generally the last two methods are used.

Decyanation by means of sodium hypochlorite can be carried out only in the case of dilute solutions (concentration below 1 g. per litre). The method has the advantage that with its application a cyanide ion concentration of 0.1–0.05 mg. per litre can be achieved in the treated solution, but it has also several drawbacks, namely: (a) the procedure is rather complicated requiring a large quantity of chemicals, several trained operators or fully automatic equipment; (b) the operation has to be carried out in a narrow pH range (pH 6 to 8) or else, particularly in concentrated solutions—hydrogen cyanide and chlorocyanide are formed which may cause serious accidents; (c) because of the aforesaid, sewage with high cyanide content must be diluted with water prior to treatment which involves water consumption and extra work.

For the decyanation of solutions containing cyanide in high concentrations mostly the ferrous sulphate method is used at present. This method has among others the drawback of lacking a satisfactory detoxication efficiency leaving in the solution 5–50 mg. of cyanide ion per litre, further the formed complex is not stable under all conditions, e.g. in the conduit or elsewhere it may decompose on contact with some acid medium and hydrogen cyanide may be liberated.

It is the object of the present invention to solve the decyanation of concentrated cyanic solutions.

The present invention provides a method for the detoxication of sewage with high cyanide concentrations without preliminary dilution whereby the cyanide content is converted into a commercially marketable product, further the water treated by this method can be led directly into the conduit system.

In order to accomplish these objects, the present invention provides a process for removing cyanide from sewage by adding under intensive agitation a formaldehyde solution of not less than 8 pH and containing at least one mol, but preferably 1.5 mols of formaldehyde for each mol of cyanide ion to the sewage and allowing the solution to stand at a temperature between room temperature and 100° C. for 50–1 hours, heating or boiling the solution and if desired the formed ammonia is absorbed and the formed glycolic acid recovered from the solution.

The invention is based upon the discovery that under suitable conditions the cyanide ion is converted quantitatively in accordance with the following reaction:

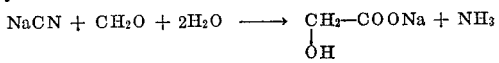

It appears from the above that the cyanide is irreversibly and quantitatively converted into a non-toxic, valuable product (glycolic acid) and in the case of large quantities the formed ammonia can also be utilized.

In an advantageous variant of the method according to the present invention the cyanide content of the sewage is determined, 1.5 mols of alkaline (pH 8) formaldehyde is added for each mol of cyanide under intensive agitation and the solution boiled for 2 hours. By means of this method in general a lower limit of 0.5 mg. of cyanide ion per litre can be achieved.

To avoid side-reactions it is important to apply intensive agitation during the addition of the formaldehyde. When the operation is performed at room temperature the residual cyanide ion concentration of the treated solution will be somewhat higher (about 5 mg. per litre) but it will be still more favourable than the one achieved by the hitherto applied methods.

The formed ammonia is absorbed in water or some other liquid and in case of larger quantities utilized.

The glycolic acid is recovered from the treated solution by means of any of the known methods, e.g. via its calcium salt.

The main advantages of the method in accordance with the present invention are as follows:

(a) It is simple and cheap.

(b) It is equally suited for the detoxication of dilute and concentrated cyanide solutions.

(c) In the course of the reaction the cyano compound is converted into products from which no toxic substance can be formed.

(d) In the course of detoxication the cyanides are converted into valuable products which influence decisively and favourably the economics of detoxication, and which moreover may make the latter profitable. Of the products firstly glycolic acid is valuable. (The price of glycolic acid on the world market is about 2 to 3 times the price of the reagents used for detoxication, and in case larger quantities of cyanide are converted the formed ammonia can also be economically utilized.)

(e) The method can be realized in both batch and continuous operation.

The following examples shall serve to illustrate the implementation of the method in accordance with the present invention:

EXAMPLE 1

To 1 kg. of sewage containing 10% b.w. of sodium cyanide (sodium cyanide content 100 g.=about 2 g. mols.

of NaCN), 250 g. of a 37% b.w. formaldehyde solution (about 3.1 g. mols. of formaldehyde) which has been first made alkaline (pH 8) with sodium hydroxide is added under intensive agitation. The solution is boiled for 2 hours under a reflux condenser and the ammonia formed in the reaction absorbed in water. At the end of the 2 hours boiling the cyanide ion concentration of the solution is about 0.5 mg. per litre.

When 1 mol of cyanide decomposes 1 mol of glycolic acid is formed. Thus according to calculation the above solution will contain 2 g. mols. (152 g.) of glycolic acid. Glycolic acid is conveniently recovered by way of its calcium salt. The hot solution is acidified with a 20% b.w. hydrochloric acid (about 500 ml.) and 102 g. of calcium carbonate is added under constant agitation. After one day standing the precipitated calcium glycolate is filtered and dried at 50° C. under 30 mm. Hg vacuum. The weight of the dry calcium glycolate is 342 g., which—calculated for sodium cyanide—corresponds to a 90% yield. The glycolic acid can be liberated from its calcium salt by adding the salt to 400 g. of 30% b.w. sulphuric acid. The precipitated calcium sulphate is separated by filtration and the solution evaporated under vacuum to the desired concentration. In this way 127 g. of glycolic acid can be obtained. Calculated for sodium cyanide the glycolic acid yield is about 84%.

EXAMPLE 2

To a sewage containing 10% b.w. of sodium cyanide enough 37% b.w. formaldehyde solution of pH 8 sufficient to obtain a cyanide: formaldehyde molar proportion of 1:2 is added. Allowed to stand at room temperature the cyanide ion content of the mixture changes as follows:

| Reaction time: | Cyanide content, mg. cyanide/litre |
|---|---|
| 16 | 14 |
| 20 | 10 |
| 40 | 9 |
| 50 | 8 |

From the solution obtained in this way the ammonia can be removed by heating or by blowing air through the solution and the calcium salt of glycolic acid can be obtained in the way described in Example 1. (It is not absolutely necessary for the recovery of glycolic acid to remove the ammonia.)

What we claim is:

1. A process for the removal of cyanide from sewage, comprising converting the cyanide to glycolic acid by adding to the sewage at least one mol of formaldehyde solution per mol of cyanide and at a pH of at least 8 with intensive agitation and allowing the solution to stand at a temperature from room temperature to 100° C. for 1 to 50 hours, and adding a metal salt to the solution to recover the glycolic acid as the metal glycolate.

2. A process as claimed in claim 1, in which said metal is calcium.

3. A process as claimed in claim 2, in which said metal salt is calcium carbonate.

4. A process as claimed in claim 1, and liberating glycolic acid from said metal glycolate by adding sulfuric acid to said metal glycolate.

5. A process as claimed in claim 1, in which said formaldehyde solution is present in an amount of at least 1.5 mol per mol of cyanide.

6. A process as claimed in claim 1, in which said formaldehyde-cyanide solution is boiled for about two hours.

References Cited

UNITED STATES PATENTS

| 2,859,090 | 11/1958 | Karchmer et al. | 23—151 X |
| 3,505,217 | 4/1970 | Morico | 210—59 |
| 3,617,582 | 11/1971 | Lawes et al. | 210—63 |

MICHAEL ROGERS, Primary Examiner

U.S. Cl. X.R.

260—535